United States Patent
Doctoroff et al.

[15] 3,645,601
[45] Feb. 29, 1972

[54] REFLECTOR FOR SPECULARLY REFLECTING VISIBLE RADIATION AND DIFFUSELY REFLECTING HEAT RADIATION

[72] Inventors: Michael Doctoroff, Rochester; Bernt D. Hoppert, Dansville; Steven H. Leece, Rochester, all of N.Y.

[73] Assignee: Bausch & Lomb Incorporated, Rochester, N.Y.

[22] Filed: Nov. 3, 1070

[21] Appl. No.: 86,464

[52] U.S. Cl. .................................. 350/1, 117/33.3, 350/166
[51] Int. Cl. .......................................................... G02b 5/26
[58] Field of Search .................... 350/1, 163, 164, 166, 290; 117/33.3; 240/41.35 R, 41.35 C, 46.49 R, 46.49 A, 47, 103; 313/112–116

[56] References Cited

UNITED STATES PATENTS

| | | | |
|---|---|---|---|
| 2,914,989 | 12/1959 | Gretener | 350/1 |
| 3,445,662 | 5/1969 | Langley | 350/1 |

OTHER PUBLICATIONS

Edwards, International Projectionist, Feb. 1935, pp. 15, 16, 23–25

*Primary Examiner*—David Schonberg
*Assistant Examiner*—Ronald J. Stern
*Attorney*—Frank C. Parker and Bernard D. Bogdon

[57] ABSTRACT

A reflector, for reflecting generally all wavelengths of radiation of visible light for generally concentrated projection of the visible light and for reflecting substantially all wavelengths of radiation of heat in a generally random pattern, is provided for by a metallic substrate having a roughened irregular surface for randomly reflecting wavelengths of radiation of heat. An intermediate layer disposed immediately upon the roughened surface of the metallic substrate provides an optically smooth base over the roughened surface for deposition of a multilayer interference reflecting coating for reflecting in a concentrated projection generally all wavelengths of radiation of visible light. As a modification the intermediate layer includes impurities for diffusingly reflecting or absorbing heat radiation for added efficiency of heat dispersion.

9 Claims, 2 Drawing Figures

MICHAEL DOCTOROFF
BERNT D. HOPPERT
STEVEN H. LEECE
INVENTORS

BY

BERNARD D. BOGDON

ATTORNEY

REFLECTOR FOR SPECULARLY REFLECTING VISIBLE RADIATION AND DIFFUSELY REFLECTING HEAT RADIATION

BACKGROUND OF THE INVENTION

1. Field of the Invention

The present invention is related to a reflector of visible light and in particular to a reflector for specularly reflecting visible light and for diffusingly reflecting heat.

2. Brief Description of the Prior Art

It is generally desirable to make reflectors for light sources for projection purposes from metallic substrates. Materials such as aluminum are easily formed to provide generally most desirable reflector configurations and aesthetic designs. Reflectors from such lightweight materials as aluminum are easily handled both in manufacturing and installation and do not require elaborate support structures. However, one noticeable shortcoming of metallic reflectors, including aluminum, is that the metal acts not only to reflect visible light at a high efficiency, but also to reflect electromagnetic radiation of wavelengths in the heat or generally infrared range.

Accordingly, to overcome this major deficiency of metallic reflectors, glass substrates were adopted. Properly coated, glass has the property of satisfactorily reflecting the visible light and transmitting the infrared radiation therethrough to thereby focus the visible light generally devoid of the presence of heat. However, glass, as is well known is fragile and accordingly, must be of relatively greater thickness at the base for strength purposes which adds considerably more weight to each illuminator.

A relatively inexpensive reflector of a metallic substrate which focuses reflected visible light at a great efficiency, and which, either effectively absorbs or diffuses wavelengths of radiation of heat to maintain the temperature of the reflector at a reasonable level and to preclude heat from being focused along with the visible light is a needed and would be a notable contribution to the art.

SUMMARY OF THE INVENTION

Applicants herein provide the description of an invention for overcoming the major deficiencies of prior art reflectors having metallic substrates. A reflector comprising generally a metallic substrate having a roughened irregular surface and an intermediate layer disposed upon the roughened surface for smoothing it for disposing thereon a multilayer interference reflecting coating is provided, for generally reflecting all wavelengths of radiation of visible light at the multilayer interference reflecting coating and for generally reflecting substantially all wavelengths of radiation of heat in a generally random pattern at the roughened surface of the metallic substrate.

DETAILED DESCRIPTION OF THE PREFERRED EMBODIMENT

Figure 1:
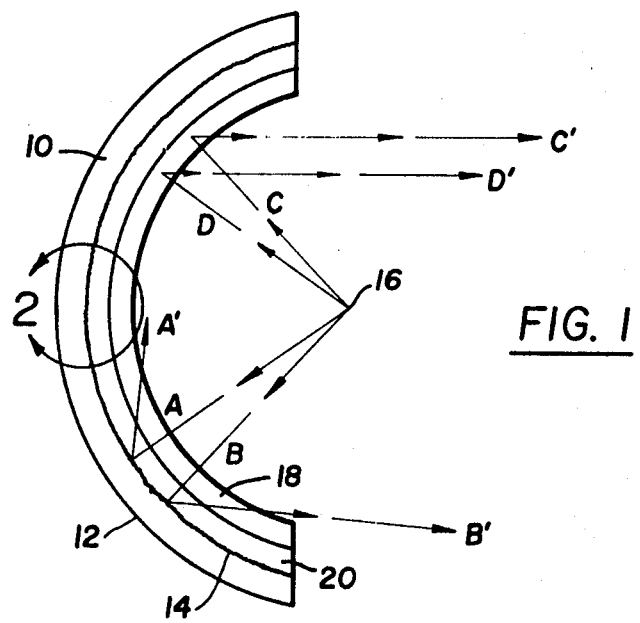
FIG. 1 is a schematic exemplary illustration of an embodiment according to the principles of the present invention.

In FIG. 1 a metallic substrate 10 formed, for example, of aluminum or aluminum alloy material is provided as a main support structure of a reflector. It is generally desirable that the material selected for the metallic substrate 10 be highly ductile, as is aluminum, for manufacturing, relatively inexpensively, for example, by stamping or other methods of cold forming, most any desirable reflector design configuration for good appearance and lighting efficiency. The exemplary embodiment of FIG. 1 is of circular configuration. It will be appreciated, however, that a myriad of other configurations may be employed according to the principles of the present invention depending only upon the particular application for the proposed reflector. Since a reflector, according to the principles of the present invention, randomly reflects heat rays, the metallic substrate 10 is of arbitrary thickness for it generally absorbs little heat and is neither designed as a conductor for transmitting heat in the support material nor for dispersing heat by convection from a back surface 12 of the metallic substrate 10. For purposes of this invention, heat is generally defined as the electromagnetic radiation in the wavelength range beyond 0.7 microns.

Figure 2:
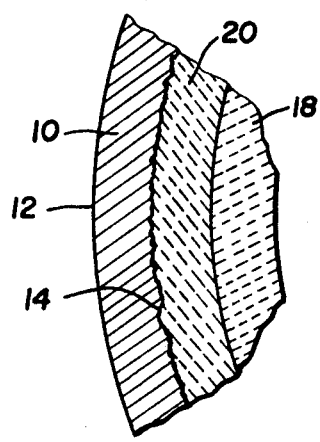
FIG. 2 is a partial enlarged cross section of the portion of the embodiment shown within the circular section 2 of FIG. 1.

The metallic substrate 10 is provided with a front surface 14 generally roughened and irregularly formed, as best seen in FIG. 2, to reflectively diffuse heat randomly. The irregular front surface 14 of the metallic substrate 10 may be formed, for example, by sandblasting.

As an example of the random dispersion of heat rays from an exemplary point light source 16, there is schematically illustrated in FIG. 1, rays A and B traversing from the light source 16 to the irregular surface 14 to randomly reflect in the directions of arrows A' and B', respectively. It is clear that the rays of electromagnetic radiation in the heat range generally scatter as they impinge upon the irregular surface 14, to thereby preclude any concentrated projection of heat energy in a specific direction. Other types of light sources such as infinite sources where the rays travel in a generally parallel pattern are also suitable for use according to the principles of the present invention.

By way of example, visible light rays C and D are shown as transmitted from the light source 16 to the interference layer 18 to reflect therefrom as generally parallel rays C' and D' for focusing at some distant point depending upon the optical configuration of the metallic substrate 10.

It is generally undesirable to include an interference layer immediately over a roughened irregular surface for it adversely effects the quality of the reflecting surface. Accordingly, an intermediate layer 20 is provided for smoothing the irregular surface 14 for deposition thereon of the interference stack 18. The intermediate layer 20 may be applied by spraying. The intermediate layer 20 is formed of any suitable material such as milled aluminum enamel manufactured by Ferro Corporation of Cleveland, Ohio.

Uniform reflection of the generally visible light, identified generally by wavelengths in the range of 0.4 through 0.7 microns is provided for by any well-known dielectric stack 18 commonly called an interference layer. Reflecting coatings for use in the present invention are well known. A particularly treatise useful in practicing the art involving interference layers is included in an article entitled "Design Of Multilayer Interference Filters" by A. Thelen on inclusive pages 47–86 in *Physics Of Thin Films*, Volume 5, edited by G. Hass and E. Thun and published by Academic Press, New York and London, 1969. The Porcelain Enamel Institute of 1900 L St., N.W., Washington D.C. 20036 in 1970 published a PEI Bulletin P–405(70) entitled "Quality Control Procedures For Porcelain Enameling Aluminum" which sets forth parameters for finishing aluminum with an intermediate layer, in sufficient detail for one skilled in the art to practice. Additionally a book entitled "Enamels" authored by A. I. Andrews, and published and copyrighted in 1935 by The Garrard Press Publishers of Champaign, Ill., describes in detail, metal preparation, enamel calculations and compositions, application and control, and generally other related subtopics for reference in practicing the herein described invention.

By modification of the herein described embodiment, random heat reflectivity can be increased. Accordingly, to aid in further diffusing heat by reflection or to absorb heat, impurities may be added to the intermediate layer 20. Impurities in the form of a fine powder of aluminum, silicon, rutile or the like, are suitable for thoroughly mixing into the, exemplary aluminum enamel, for example, in a 1–10 percent by weight measure. The intermediate layer mixture may then be applied, as hereinbefore explained, by spraying. Satisfactory results were obtained by adding an impurity of low infrared reflectance pigment identified under Catalog No. V–8295 and manufactured by Ferro Corporation of Cleveland, Ohio.

What is claimed is:

1. A reflector for reflecting generally all wavelengths of radiation for providing visible light and for reflecting substantially all wavelengths of radiation for providing heat in a diffusing pattern, comprising:
   a metallic substrate having a roughened irregular surface;
   an intermediate layer disposed immediately upon the roughened irregular surface of the metallic substrate, said intermediate layer formed of a material suitable for providing a smooth surface; and
   a multilayer interference reflecting coating disposed upon the smooth surface of the intermediate layer for reflecting substantially all wavelengths of radiation for providing visible light and for transmitting therethrough to the roughened irregular surface of the metallic substrate substantially all wavelengths of radiation providing heat.

2. The reflector as defined in claim 1, wherein the metallic substrate has a sandblasted roughened irregular surface.

3. The reflector as defined in claim 1, wherein the metallic substrate is formed of aluminum.

4. The reflector as defined in claim 1, wherein the intermediate layer disposed immediately upon the roughened irregular surface of the metallic substrate is formed of sprayed glass.

5. The reflector as defined in claim 1, wherein the intermediate layer includes an impurity for diffusingly reflecting wavelengths of heat radiation.

6. The reflector as defined in claim 5, wherein the impurity is a fine powdery material.

7. The reflector as defined in claim 1, wherein the intermediate layer includes an impurity for absorbing wavelengths of heat radiation.

8. The reflector as defined in claim 7, wherein the impurity is a fine powdery material.

9. A reflector for reflecting generally all wavelengths of radiation for providing visible light and for reflecting substantially all wavelengths of radiation for providing heat in a diffusing pattern, comprises:
   a metallic substrate formed of aluminum having a sandblasted roughened irregular surface;
   an intermediate layer disposed immediately upon the roughened irregular surface of the metallic substrate, said intermediate layer formed of sprayed glass for providing the smooth surface; and
   a multilayer interference reflecting coating disposed upon the smooth surface of the intermediate layer for reflecting substantially all wavelengths of radiation of visible light and for transmitting therethrough to the reflected irregular surface of the metallic substrate all wavelengths of radiation of heat.

* * * * *